United States Patent
Yu et al.

(10) Patent No.: US 9,232,212 B2
(45) Date of Patent: Jan. 5, 2016

(54) METHOD FOR REDUCING CROSSTALK OF STEREOSCOPIC IMAGE

(71) Applicant: AU Optronics Corp., Hsin-Chu (TW)

(72) Inventors: Ti-Kuei Yu, Hsin-Chu (TW); Te-Wei Chan, Hsin-Chu (TW); Jen-Lang Tung, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 335 days.

(21) Appl. No.: 13/913,497

(22) Filed: Jun. 9, 2013

(65) Prior Publication Data

US 2014/0198100 A1     Jul. 17, 2014

(30) Foreign Application Priority Data

Jan. 15, 2013   (TW) .............................. 102101523 A (51) Int. Cl.
| | |
|---|---|
| H04N 13/04 | (2006.01) |
| H04N 1/00 | (2006.01) |
| G06T 19/20 | (2011.01) |
| G02B 27/22 | (2006.01) |
| H04N 13/00 | (2006.01) |

(52) U.S. Cl.
CPC ........... *H04N 13/04* (2013.01); *H04N 13/0007* (2013.01); *G02B 27/22* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 2008/0042924 A1* | 2/2008 | Lee et al. ........................... | 345/4 |
| 2010/0220175 A1* | 9/2010 | Claydon et al. .................. | 348/43 |
| 2011/0025832 A1 | 2/2011 | Cowan | |
| 2011/0090308 A1 | 4/2011 | Chen | |
| 2011/0273439 A1 | 11/2011 | Son | |
| 2012/0050498 A1* | 3/2012 | Jung et al. ....................... | 348/51 |
| 2012/0057780 A1 | 3/2012 | Matsumoto | |
| 2012/0147138 A1* | 6/2012 | Yu ................................... | 348/43 |

FOREIGN PATENT DOCUMENTS

| | | |
|---|---|---|
| CN | 102379003 A | 3/2012 |
| CN | 102811363 A | 12/2012 |
| JP | H08331600 A | 12/1996 |

OTHER PUBLICATIONS

Andrew J. Woods, "How are Crosstalk and Ghosting defined in the Stereoscopic Literature", 2011, Society of Photo-Optical Instrumentation Engineers.*

* cited by examiner

*Primary Examiner* — Mark Zimmerman
*Assistant Examiner* — Yu-Jang Tswei
(74) *Attorney, Agent, or Firm* — Winston Hsu; Scott Margo (57) ABSTRACT

A stereoscopic display method includes generating a left-eye crosstalk parameter according to left-eye image data and right-eye image data; generating a right-eye crosstalk parameter according to the left-eye image data and the right-eye image data; generating calibrated left-eye image data according to the left-eye image data, the right-eye image data, the left-eye crosstalk parameter, and the right-eye crosstalk parameter; generating calibrated right-eye image data according to the left-eye image data, the right-eye image data, the left-eye crosstalk parameter, and the right-eye crosstalk parameter; and displaying the calibrated left-eye image data and the calibrated right-eye image data on a display apparatus.

14 Claims, 10 Drawing Sheets

FIG. 1A

| LX-LUT | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | 0 | 9.8% | 9.7% | 9.9% | 9.9% | 9.9% | 10.0% | 10.0% | 10.0% | 10.2% | 10.6% | 11.1% | 11.6% | 12.1% | 13.2% | 15.1% | 16.9% |
| 16 | 32.0% | 0 | 7.7% | 4.4% | 2.7% | 1.7% | 2.6% | 4.4% | 5.6% | 6.6% | 7.6% | 8.5% | 9.4% | 10.2% | 11.5% | 13.6% | 15.6% |
| 32 | 22.9% | 14.0% | 0 | 18.1% | 11.1% | 3.6% | 6.3% | 2.3% | 0.6% | 0.2% | 2.3% | 4.2% | 5.8% | 7.0% | 8.8% | 11.3% | 13.5% |
| 48 | 23.4% | 2.7% | 11.5% | 0 | 16.3% | 9.6% | 9.1% | 6.1% | 4.6% | 3.5% | 0.9% | 0.1% | 1.1% | 3.0% | 5.2% | 8.2% | 10.8% |
| 64 | 19.8% | 5.5% | 12.8% | 4.2% | 0 | 9.3% | 9.9% | 9.0% | 7.1% | 4.7% | 3.5% | 2.2% | 0.4% | 0.8% | 0.7% | 4.2% | 7.1% |
| 80 | 16.0% | 14.2% | 1.5% | 0.0% | 3.1% | 0 | 7.6% | 4.0% | 7.4% | 6.8% | 4.3% | 3.7% | 3.0% | 1.9% | 2.3% | 1.3% | 3.1% |
| 96 | 13.8% | 16.3% | 2.1% | 0.7% | 0.6% | 7.6% | 0 | 8.6% | 5.8% | 3.7% | 4.9% | 5.4% | 3.8% | 3.1% | 3.5% | 3.3% | 3.1% |
| 112 | 12.8% | 13.7% | 1.2% | 2.6% | 1.1% | 7.2% | 1.1% | 0 | 7.9% | 3.4% | 4.3% | 4.1% | 4.3% | 5.4% | 4.9% | 5.8% | 9.0% |
| 128 | 11.6% | 13.5% | 12.5% | 4.9% | 0.1% | 3.0% | 4.0% | 5.1% | 0 | 4.1% | 6.4% | 5.1% | 4.5% | 4.7% | 6.0% | 6.2% | 11.2% |
| 144 | 10.8% | 11.4% | 15.3% | 5.6% | 3.0% | 3.1% | 4.5% | 6.6% | 3.4% | 0 | 8.7% | 5.1% | 5.4% | 4.8% | 5.8% | 6.3% | 9.6% |
| 160 | 8.6% | 8.9% | 9.5% | 8.4% | 4.8% | 5.4% | 4.2% | 5.9% | 4.0% | 5.2% | 0 | 7.6% | 6.8% | 5.3% | 5.8% | 5.9% | 9.2% |
| 176 | 6.2% | 7.4% | 6.8% | 8.9% | 6.0% | 5.4% | 3.5% | 5.5% | 5.3% | 7.0% | 1.8% | 0 | 9.4% | 5.6% | 6.9% | 6.5% | 9.4% |
| 192 | 4.8% | 5.7% | 5.0% | 6.3% | 7.2% | 5.1% | 3.9% | 5.4% | 6.5% | 6.2% | 3.3% | 4.1% | 0 | 5.4% | 8.2% | 7.2% | 10.4% |
| 208 | 4.9% | 4.8% | 5.2% | 5.5% | 5.5% | 5.1% | 3.5% | 3.9% | 4.6% | 5.1% | 3.9% | 5.7% | 9.1% | 0 | 8.2% | 6.4% | 10.6% |
| 224 | 3.3% | 3.9% | 3.2% | 4.2% | 4.4% | 5.1% | 2.8% | 2.4% | 4.6% | 4.9% | 4.5% | 4.3% | 4.2% | 4.6% | 0 | 3.3% | 7.8% |
| 240 | 2.4% | 2.7% | 2.3% | 2.6% | 3.0% | 3.7% | 4.7% | 4.1% | 4.5% | 5.1% | 4.6% | 5.4% | 5.9% | 6.2% | 6.8% | 0 | 5.4% |
| 255 | 4.8% | 4.8% | 4.8% | 4.8% | 5.4% | 5.7% | 4.9% | 4.6% | 4.5% | 4.6% | 4.5% | 4.3% | 5.5% | 6.1% | 6.9% | 9.3% | 0 |

Left-eye (viewing-eye) grey level / Right-eye grey level

FIG. 1B

| RX-LUT | \ | Left-eye grey level | | | | | | | | | | | | | | | |
|---|---|---|---|---|---|---|---|---|---|---|---|---|---|---|---|---|---|
| | | 0 | 16 | 32 | 48 | 64 | 80 | 96 | 112 | 128 | 144 | 160 | 176 | 192 | 208 | 224 | 240 | 255 |
| Right-eye (viewing-eye) grey level | 0 | 0 | 9.3% | 8.6% | 8.6% | 8.3% | 8.2% | 8.1% | 8.0% | 8.0% | 8.1% | 8.4% | 8.8% | 9.2% | 9.6% | 10.5% | 12% | 13.2% |
| | 16 | 18.2% | 0 | 4.9% | 2.0% | 0.9% | 0.4% | 1.5% | 3.0% | 4.0% | 4.9% | 5.7% | 6.4% | 7.2% | 7.9% | 8.9% | 10.6% | 12.0% |
| | 32 | 10.2% | 8.8% | 0 | 14.3% | 8.8% | 0.8% | 3.5% | 0.1% | 2.1% | 1.5% | 0.7% | 2.3% | 3.8% | 4.9% | 6.4% | 8.4% | 10% |
| | 48 | 11.9% | 12.8% | 20.3% | 0 | 12.4% | 6.3% | 6.0% | 3.2% | 2.1% | 1.1% | 1.1% | 1.7% | 0.6% | 1.0% | 3% | 5.5% | 7.4% |
| | 64 | 10.3% | 4.4% | 20.7% | 10.0% | 0 | 5.5% | 6.4% | 5.4% | 3.8% | 1.7% | 0.7% | 0.4% | 1.9% | 1.5% | 1.5% | 1.5% | 3.9% |
| | 80 | 7.5% | 5.9% | 9.1% | 5.9% | 8.6% | 0 | 3.5% | 0.5% | 4.0% | 3.3% | 0.8% | 0.4% | 0.2% | 1.2% | 0.7% | 1.7% | 0.3% |
| | 96 | 6.3% | 8.9% | 9.5% | 5.2% | 5.2% | 2.3% | 0 | 5.3% | 2.5% | 0.2% | 1.3% | 1.8% | 0.2% | 0.7% | 0.5% | 0.8% | 1.4% |
| | 112 | 5.6% | 6.7% | 8.0% | 3.7% | 6.7% | 1.4% | 4.6% | 0 | 5.6% | 0.1% | 0.7% | 0.3% | 0.4% | 1.6% | 0.6% | 1.2% | 3.1% |
| | 128 | 6.0% | 6.7% | 6.8% | 0.4% | 5.8% | 2.2% | 2.0% | 1.2% | 0 | 1.7% | 3.1% | 1.1% | 0.2% | 0.6% | 1.7% | 1.2% | 4.6% |
| | 144 | 5.4% | 6.1% | 9.2% | 0.7% | 2.1% | 2.1% | 0.9% | 1.1% | 0.2% | 0 | 6.1% | 1.1% | 0.7% | 0.1% | 1.1% | 1.1% | 2.3% |
| | 160 | 3.9% | 3.9% | 4.1% | 3.1% | 0.5% | 0.7% | 0.9% | 0.8% | 0.4% | 3.3% | 0 | 4.3% | 2.2% | 0.3% | 0% | 0.2% | 1.4% |
| | 176 | 2.1% | 3.1% | 2.4% | 4.0% | 1.2% | 1.5% | 0.8% | 0.8% | 0.3% | 3.3% | 0.3% | 0 | 3.8% | 0.3% | 0.5% | 0.2% | 1.0% |
| | 192 | 0.7% | 1.6% | 0.9% | 2.2% | 2.6% | 1.0% | 0.1% | 1.4% | 2.1% | 1.7% | 0.3% | 2.0% | 0 | 0.8% | 1.6% | 0.2% | 0.9% |
| | 208 | 1.1% | 1.2% | 1.7% | 1.6% | 1.4% | 1.2% | 0.1% | 0.3% | 1.0% | 1.2% | 0.3% | 2.3% | 6.4% | 0 | 1.3% | 0.2% | 0.2% |
| | 224 | 0% | 0.6% | 0.1% | 1.0% | 0.6% | 1.5% | 0.3% | 0.5% | 0.9% | 1.0% | 0.1% | 1.6% | 0% | 2.8% | 0 | 1.5% | 3.4% |
| | 240 | 0.6% | 0.3% | 0.3% | 0.2% | 0.3% | 0.5% | 1.6% | 1.7% | 1.5% | 1.7% | 0.7% | 2.4% | 2.5% | 1.2% | 1.6% | 0 | 4.8% |
| | 255 | 3.3% | 3.2% | 3.2% | 3.6% | 3.8% | 3.7% | 3.4% | 3.1% | 3.1% | 2.9% | 2.8% | 3.1% | 3.4% | 3.6% | 3.8% | 2.9% | 0 |

FIG. 1C

| Brightness (nits) | Right-eye grey level | | | | | | | |
|---|---|---|---|---|---|---|---|---|
| | 0 | 16 | 32 | 48 | 64 | 80 | 96 | 112 |
| 0 | 0.0360 | 0.2389 | 0.5714 | 0.9711 | 1.4806 | 2.0666 | 2.8075 | 3.6181 |
| 16 | 1.4497 | 2.1144 | 2.3787 | 2.4429 | 2.4495 | 2.4356 | 2.7897 | 3.6143 |
| 32 | 4.2902 | 5.0698 | 5.5525 | 6.2702 | 6.5564 | 6.0885 | 6.9519 | 6.2439 |
| 48 | 7.2923 | 9.7136 | 9.9702 | 9.5131 | 10.3468 | 10.5689 | 11.1738 | 11.1355 |
| 64 | 11.7446 | 13.9481 | 15.7986 | 14.8506 | 14.6360 | 15.1793 | 15.9378 | 16.5624 |
| 80 | 17.2133 | 17.8813 | 20.7141 | 20.4908 | 20.6702 | 20.4902 | 21.0444 | 21.1048 |
| 96 | 23.9032 | 23.5688 | 28.1988 | 27.6093 | 27.6663 | 27.1880 | 27.7394 | 28.4489 |
| 112 | 31.3851 | 31.3470 | 36.3587 | 35.2993 | 36.2145 | 34.8715 | 35.8954 | 36.9845 |
| 128 | 39.9557 | 39.4100 | 40.2470 | 43.4660 | 45.1791 | 44.4639 | 44.5174 | 44.7350 |
| 144 | 48.7195 | 48.6229 | 47.1204 | 52.0897 | 53.4268 | 53.5598 | 53.4331 | 53.4106 |
| 160 | 59.6254 | 59.6475 | 59.6002 | 60.5637 | 62.8289 | 62.8178 | 63.6858 | 63.5342 |
| 176 | 71.9962 | 71.2717 | 71.9151 | 70.7843 | 73.0777 | 73.7425 | 75.0756 | 74.5554 |
| 192 | 84.7614 | 84.0935 | 84.8464 | 84.0252 | 83.6947 | 85.4879 | 86.6505 | 86.1551 |
| 208 | 96.2075 | 96.3910 | 96.2108 | 96.1169 | 96.3870 | 97.0804 | 98.5514 | 98.6204 |
| 224 | 110.8838 | 110.3325 | 111.1456 | 110.2290 | 110.2722 | 109.8593 | 112.1960 | 112.7414 |
| 240 | 125.3162 | 125.0920 | 125.6012 | 125.3568 | 125.0551 | 124.4204 | 123.7559 | 124.6746 |
| 255 | 132.4436 | 132.5286 | 132.6707 | 132.8026 | 132.3527 | 132.3416 | 133.6007 | 134.3620 |
| | Left-eye (viewing-eye) grey level | | | | | | | |

FIG. 1D

| Brightness (nits) | Right-eye grey level | | | | | | | | | |
|---|---|---|---|---|---|---|---|---|---|---|
| | 128 | 144 | 160 | 176 | 192 | 208 | 224 | 240 | 255 |
| 0 | 4.5726 | 5.5794 | 6.9276 | 8.5232 | 10.3753 | 12.2992 | 15.2125 | 19.4359 | 23.5418 |
| 16 | 4.5361 | 5.5798 | 6.8977 | 8.4490 | 10.2904 | 12.2348 | 15.0781 | 19.3018 | 23.5115 |
| 32 | 5.3165 | 5.4720 | 6.9302 | 8.5268 | 10.3786 | 12.2151 | 15.2034 | 19.3874 | 23.5272 |
| 48 | 11.1711 | 11.0707 | 10.0211 | 9.4449 | 10.3676 | 12.2197 | 15.0300 | 19.3192 | 23.4789 |
| 64 | 16.8126 | 16.5292 | 16.4064 | 16.0218 | 14.9562 | 15.3116 | 15.3493 | 19.3919 | 23.4622 |
| 80 | 22.3082 | 22.8019 | 22.4047 | 22.5718 | 22.5593 | 22.0532 | 22.6908 | 21.8688 | 24.2170 |
| 96 | 28.7462 | 28.7350 | 29.5701 | 30.3865 | 30.0952 | 30.0001 | 30.8175 | 31.0207 | 31.2310 |
| 112 | 36.7117 | 36.6176 | 37.2467 | 37.6652 | 38.2755 | 39.4894 | 39.8055 | 41.3811 | 45.2966 |
| 128 | 45.2101 | 45.5935 | 46.4891 | 46.8102 | 47.1733 | 47.8299 | 49.3708 | 50.3756 | 55.7059 |
| 144 | 54.3128 | 54.6345 | 55.5564 | 55.7671 | 56.4914 | 56.8736 | 58.1119 | 59.2681 | 62.7258 |
| 160 | 64.4523 | 64.7021 | 65.2563 | 66.1349 | 66.8650 | 67.1432 | 68.0975 | 69.9711 | 72.0659 |
| 176 | 75.1226 | 75.2278 | 76.5800 | 76.7867 | 77.9373 | 78.1595 | 79.4035 | 80.1579 | 82.6683 |
| 192 | 86.1728 | 86.8835 | 88.2398 | 88.5139 | 89.0137 | 89.6692 | 91.1196 | 91.8468 | 94.2276 |
| 208 | 98.5670 | 98.7719 | 99.7446 | 99.7738 | 100.0489 | 101.1546 | 102.2677 | 102.9066 | 105.1647 |
| 224 | 111.4918 | 111.7380 | 112.4646 | 113.0285 | 113.5957 | 114.0456 | 114.6685 | 115.1227 | 116.5785 |
| 240 | 124.7306 | 124.7021 | 125.5245 | 125.6564 | 126.1344 | 126.7605 | 127.5112 | 128.4512 | 129.0235 |
| 255 | 134.8658 | 135.1671 | 135.7417 | 136.3652 | 136.3206 | 136.7632 | 137.3947 | 138.0785 | 139.0711 |

Left-eye (viewing-eye) grey level

FIG. 1E

| Brightness (nits) | | 0 | 16 | 32 | 48 | 64 | 80 | 96 | 112 |
|---|---|---|---|---|---|---|---|---|---|
| Right-eye (viewing-eye) grey level | 0 | 0.0323 | 0.1847 | 0.4209 | 0.7036 | 1.0593 | 1.4732 | 1.9920 | 2.5690 |
| | 16 | 1.3747 | 1.6734 | 1.8141 | 1.7982 | 1.7735 | 1.7409 | 1.9888 | 2.5653 |
| | 32 | 4.0822 | 4.2905 | 4.5429 | 5.0213 | 5.2293 | 4.6471 | 5.2332 | 4.5806 |
| | 48 | 6.9470 | 8.6737 | 8.5567 | 7.8781 | 8.4332 | 8.4961 | 8.8610 | 8.6490 |
| | 64 | 11.1036 | 12.8432 | 13.9956 | 12.8196 | 12.3714 | 12.6614 | 13.1285 | 13.4071 |
| | 80 | 16.3048 | 16.6735 | 18.8079 | 18.1974 | 18.0748 | 17.6220 | 17.8485 | 17.6953 |
| | 96 | 22.6183 | 22.1441 | 26.0148 | 24.9944 | 24.7618 | 23.9934 | 24.1465 | 24.5436 |
| | 112 | 29.8318 | 29.6153 | 33.7861 | 32.4898 | 32.9002 | 31.4103 | 31.9502 | 31.6093 |
| | 128 | 37.6051 | 37.4459 | 37.6095 | 40.1392 | 41.6112 | 40.4951 | 40.3288 | 39.9064 |
| | 144 | 45.9937 | 45.7881 | 44.5934 | 48.3697 | 49.3966 | 49.3024 | 48.8511 | 48.4562 |
| | 160 | 56.0826 | 56.1414 | 56.1800 | 56.8256 | 58.1450 | 58.0731 | 58.6914 | 58.1526 |
| | 176 | 67.5045 | 66.8885 | 67.3654 | 66.5253 | 68.2800 | 68.1800 | 69.3194 | 68.6482 |
| | 192 | 79.5398 | 78.8545 | 79.4133 | 78.5153 | 78.3891 | 79.5057 | 80.0964 | 79.4363 |
| | 208 | 90.2497 | 90.1604 | 89.7811 | 89.9165 | 90.0853 | 90.3655 | 91.2972 | 91.0262 |
| | 224 | 103.5253 | 102.9900 | 103.4801 | 102.6118 | 102.9841 | 102.2780 | 103.8331 | 103.9449 |
| | 240 | 116.9783 | 116.7152 | 116.6403 | 116.5259 | 116.6125 | 115.8322 | 114.8716 | 114.8833 |
| | 255 | 123.7283 | 123.9038 | 124.0550 | 123.6867 | 123.6310 | 123.9365 | 124.4262 | 124.9652 |

FIG. 1F

| Brightness (nits) | 128 | 144 | 160 | 176 | 192 | 208 | 224 | 240 | 255 |
|---|---|---|---|---|---|---|---|---|---|
| 0 | 3.2349 | 3.9687 | 4.9247 | 6.0668 | 7.4081 | 8.7944 | 10.8698 | 13.9553 | 16.8703 |
| 16 | 3.2151 | 3.9523 | 4.9109 | 6.0069 | 7.3150 | 8.7552 | 10.7896 | 13.8727 | 16.8604 |
| 32 | 3.8094 | 3.8864 | 4.9365 | 6.0554 | 7.4010 | 8.7522 | 10.8834 | 13.9085 | 16.8341 |
| 48 | 8.5456 | 8.3467 | 7.3316 | 6.8097 | 7.4179 | 8.7305 | 10.7862 | 13.8745 | 16.8243 |
| 64 | 13.4176 | 12.9921 | 12.7071 | 12.1665 | 11.1009 | 11.1777 | 11.0061 | 13.9632 | 16.8493 |
| 80 | 18.5202 | 18.6508 | 17.9651 | 17.8202 | 17.5065 | 16.7703 | 17.0117 | 15.9069 | 17.3321 |
| 96 | 24.5442 | 24.1959 | 24.6006 | 24.9537 | 24.2517 | 23.7056 | 23.7777 | 23.4150 | 22.7375 |
| 112 | 32.0761 | 31.6292 | 31.7913 | 31.7350 | 31.8928 | 32.5700 | 32.0716 | 32.5966 | 34.6221 |
| 128 | 40.0088 | 40.1519 | 40.5741 | 40.3276 | 40.0993 | 40.2997 | 41.1196 | 40.9578 | 44.0392 |
| 144 | 48.6267 | 48.6417 | 49.2333 | 48.8671 | 48.8548 | 48.6100 | 49.2520 | 49.4006 | 50.4542 |
| 160 | 58.4497 | 58.0536 | 58.3701 | 58.8264 | 58.8547 | 58.2821 | 58.3791 | 58.4930 | 59.3784 |
| 176 | 68.8632 | 68.2702 | 68.9135 | 68.9424 | 69.3681 | 69.0155 | 69.1092 | 68.8642 | 69.5547 |
| 192 | 79.2774 | 79.5823 | 80.1737 | 79.9038 | 80.1282 | 80.0442 | 80.5123 | 80.0558 | 80.5431 |
| 208 | 90.6930 | 90.7096 | 91.2459 | 90.7130 | 90.6201 | 91.2157 | 91.3797 | 90.8372 | 91.2992 |
| 224 | 103.0042 | 103.0037 | 103.2660 | 103.0311 | 103.5688 | 103.9218 | 103.5704 | 102.8512 | 102.7323 |
| 240 | 115.2125 | 115.1466 | 115.4418 | 115.1933 | 115.4152 | 116.0191 | 116.5317 | 116.3266 | 115.7635 |
| 255 | 125.2672 | 125.6492 | 126.0287 | 126.1759 | 126.3531 | 126.6648 | 127.0648 | 127.6496 | 127.9841 |

Left-eye grey level

Right-eye (viewing-eye) grey level

METHOD FOR REDUCING CROSSTALK OF STEREOSCOPIC IMAGE

BACKGROUND OF THE INVENTION

1. Field of the Invention

The present disclosure relates generally to a stereoscopic image compensation method, and more particularly, to a stereoscopic image compensation method for reducing stereoscopic image crosstalk.

2. Description of the Prior Art

As technology advances, the desire for better image display quality has gradually increased. In order to imitate real image display, stereo display technology has become the focus of development. The most common stereo display technologies are naked-eye stereo display technology and glass-type stereo display technology. The glass-type stereo display technology can be implemented by a time-multiplexed stereo display apparatus with shutter glasses, a time-multiplexed stereo display apparatus with polarized glasses, and a spatial-multiplexed stereo display apparatus with polarized glasses. However, conventional stereo display apparatuses cannot completely separate left-eye stereoscopic images from right-eye stereoscopic images, and thus leads to crosstalk between the left-eye stereoscopic images and the right-eye stereoscopic images, degrading the image display quality of the stereo display apparatuses.

In general, the crosstalk of a stereo display panel is consistent throughout the display panel. Nevertheless, different kinds of stereo display technologies and processes might cause crosstalk variations in different parts of the stereo display panel. Therefore, using a fixed crosstalk compensation parameter to compensate crosstalk of the stereo display panel may result in under compensation and over compensation in different areas of the stereo display panel.

SUMMARY OF THE INVENTION

An embodiment of the present disclosure discloses a stereoscopic display method. The stereoscopic display method comprises generating a left-eye crosstalk parameter according to left-eye image data and right-eye image data; generating a right-eye crosstalk parameter according to the left-eye image data and the right-eye image data; generating calibrated left-eye image data according to the left-eye image data, the right-eye image data, the left-eye crosstalk parameter, and the right-eye crosstalk parameter; generating calibrated right-eye image data according to the left-eye image data, the right-eye image data, the left-eye crosstalk parameter, and the right-eye crosstalk parameter; and displaying the calibrated left-eye image data and the calibrated right-eye image data on a display apparatus.

Another embodiment of the present disclosure discloses a stereoscopic display method. The stereoscopic display method comprises receiving image data of an image frame, the image frame comprising a plurality of image blocks. In each of the image blocks, a left-eye crosstalk parameter is generated according to left-eye image data of the image block and right-eye image data of the image block; a right-eye crosstalk parameter is generated according to the left-eye image data and the right-eye image data; calibrated left-eye image data of the image block is generated according to the left-eye image data, the right-eye image data, the left-eye crosstalk parameter, and the right-eye crosstalk parameter; and calibrated right-eye image data of the image block is generated according to the left-eye image data, the right-eye image data, the left-eye crosstalk parameter, and the right-eye crosstalk parameter. The calibrated left-eye image data and calibrated right-eye image data of the image blocks are then displayed on a display apparatus.

Another embodiment of the present disclosure discloses a stereoscopic display system. The stereoscopic display system comprises a data driver, a stereo display apparatus electrically connected to the data driver, a memory electrically connected to the data driver, a left-eye grey level crosstalk look up table stored in the memory and a right-eye grey level crosstalk look up table stored in the memory. The data driver is configured to receive left-eye image data and right-eye image data of an image frame. The image frame comprises a plurality of image blocks. The stereo display apparatus is configured to display calibrated left-eye image data of the image blocks and calibrated right-eye image data of the image blocks. The left-eye grey level crosstalk look up table comprises left-eye crosstalk parameters caused by the right-eye image data when the display apparatus is viewed by a left eye. The right-eye grey level crosstalk look up table comprises right-eye crosstalk parameters caused by the left-eye image data when the display apparatus is viewed by a right eye.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1B is the left-eye grey level crosstalk parameter look up table according to one embodiment the present invention.

FIG. 1C is the right-eye grey level crosstalk parameter look up table according to one embodiment of the present invention.

FIGS. 1D and 1E are left-eye brightness tables according to one embodiment of the present invention.

DETAILED DESCRIPTION

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

Figure 1A:
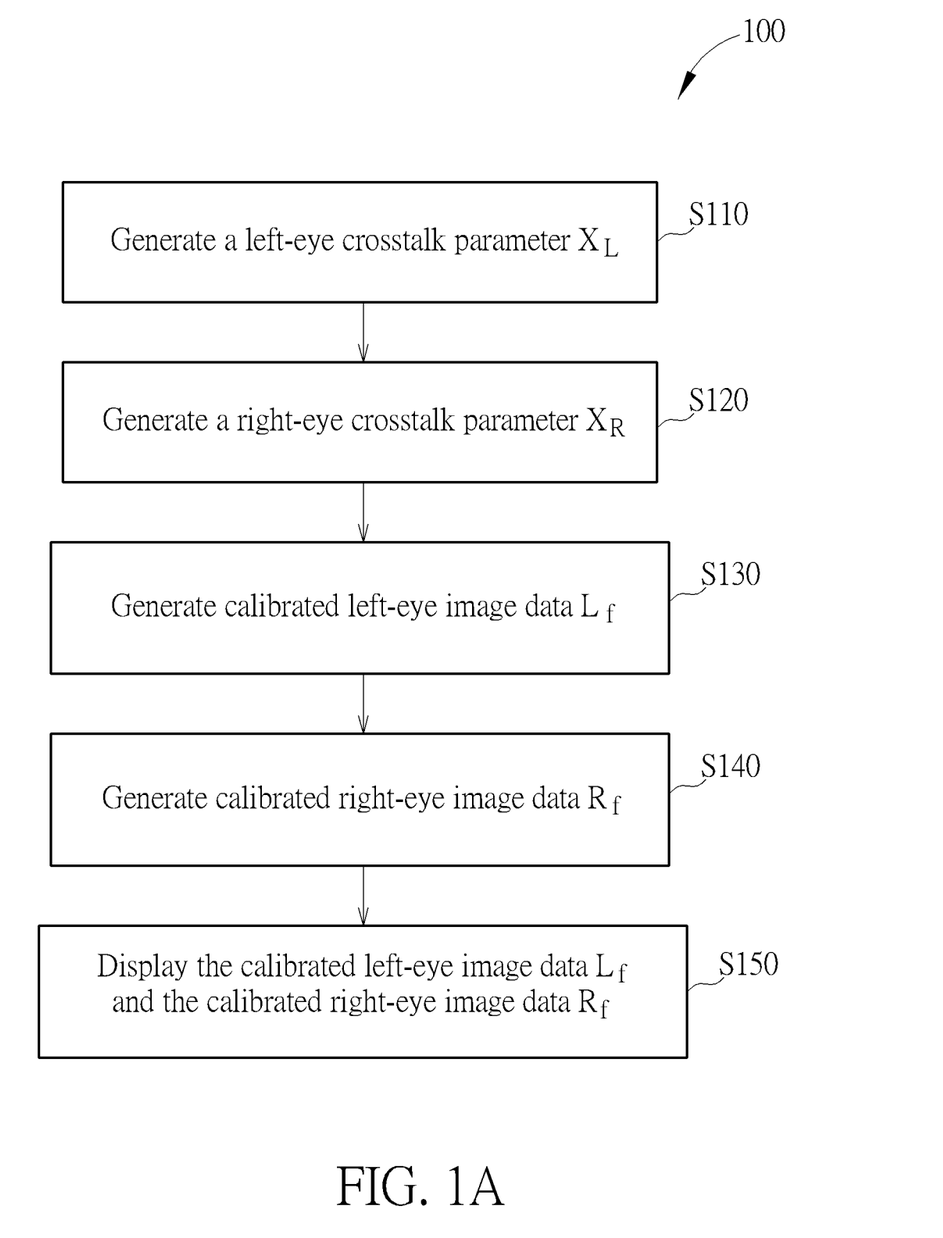
FIG. 1A is a flowchart of a stereoscopic display method according to one embodiment of the present invention.

Referring to FIG. 1A, FIG. 1A is a flowchart of a stereoscopic display method 100 according to one embodiment of the present invention. Steps of the stereoscopic display method 100 are described as follows. The steps are not limited in the following sequence. For example, step S120 can be performed before step S110.

S110: generate a left-eye crosstalk parameter $X_L$ according to left-eye image data $L_i$ and right-eye image data $R_i$;

S120: generate a right-eye crosstalk parameter $X_R$ according to the left-eye image data $L_i$ and the right-eye image data $R_i$;

S130: generate calibrated left-eye image data $L_f$ according to the left-eye image data $L_i$, the right-eye image data $R_i$, the left-eye crosstalk parameter $X_L$, and the right-eye crosstalk parameter $X_R$;

S140: generate calibrated right-eye image data $R_f$ according to the left-eye image data $L_i$, the right-eye image data $R_i$, the left-eye crosstalk parameter $X_L$, and the right-eye crosstalk parameter $X_R$; and S150: display the calibrated left-eye image data $L_f$ and the calibrated right-eye image data $R_f$ on a display apparatus.

Detailed steps are depicted below. A stereo display apparatus receives the left-eye image data $L_i$ and the right-eye image data $R_i$. The display apparatus can be a time-multiplexed stereo display panel or a spatial-multiplexed stereo display panel It has a memory unit. A left-eye grey level crosstalk parameter look up table LX-LUT and a right-eye grey level crosstalk parameter look up table RX-LUT are stored in the memory unit. The left-eye grey level crosstalk parameter look up table LX-LUT comprises left-eye crosstalk parameters $X_L$ caused by the right-eye image data $R_i$ when the display apparatus is viewed by a left eye. The right-eye grey level crosstalk parameter look up table RX-LUT comprises right-eye crosstalk parameter $X_R$ caused by left-eye image data $L_i$ when the display apparatus is viewed by a right eye. In step S110, a corresponding left-eye crosstalk parameter $X_L$ is selected from the left-eye grey level crosstalk parameter look up table LX-LUT according to grey levels of the left-eye image data $L_i$ and right-eye image data $R_i$. In step S120, a corresponding right-eye crosstalk parameter $X_R$ is selected from the right-eye grey level crosstalk parameter look up table RX-LUT according to grey levels of the left-eye image data $L_i$ and right-eye image data $R_i$.

Referring to FIG. 1B, FIG. 1B is the left-eye grey level crosstalk parameter look up table LX-LUT according to grey levels of the left-eye image data $L_i$ and right-eye image data $R_i$, which represents the left-eye crosstalk parameter $X_L$ of the left-eye image data $L_i$ caused by the right-eye image data $R_i$ when the display apparatus is viewed by the left eye. Grey levels of the left-eye image data $L_i$ are shown along the y-axis and grey levels of the right-eye image data $R_i$ are shown along the x-axis.

Referring to FIG. 1C, FIG. 1C is the right-eye grey level crosstalk parameter look up table RX-LUT according to grey levels of the left-eye image data $L_i$ and right-eye image data $R_i$, which represents the right-eye crosstalk parameter $X_R$ of the right-eye image data $R_i$ caused by the left-eye image data $L_i$ when the display apparatus is viewed by the right eye. Grey levels of the right-eye image data $R_i$ are shown along the y-axis and grey levels of the left-eye image data $L_i$ are shown along the x-axis. Grey level scale may be regarded as a standard color scale modeling image luminance of each pixel in grey scale. It can be scaled from 0 to 255, where 0 corresponds to the darkest grey level regarded as a black color and 255 represents the brightest grey level.

For example, when the grey level of the left-eye image data $L_i$ is 112, the grey level of the right-eye image data $R_i$ is 64, and the display apparatus is viewed by a left eye, step S110 will generate a corresponding left-eye crosstalk parameter $X_L$ of about 1.1% according to the left-eye grey level crosstalk parameter look up table LX-LUT. When the grey level of the left-eye image data $L_i$ is 112, the grey level of the right-eye image data $R_i$ is 64, and the display apparatus is viewed by a right eye, step S120 will generate a corresponding right-eye crosstalk parameter $X_R$ of about 5.4% according to the right-eye grey level crosstalk parameter look up table RX-LUT.

The left-eye grey level crosstalk parameter look up table LX-LUT and the right-eye grey level crosstalk parameter look up table RX-LUT may be designed adaptively according to characteristics of each display panel. Hence, the embodiment of this disclosure can be applied to various kinds of stereoscopic display panels.

In step S130 and S140, a processing unit of the display apparatus may generate a calibrated left-eye image data $L_f$ and a calibrated right-eye image data $R_f$ according to the left-eye image data $L_i$, the right-eye image data $R_i$, the left-eye crosstalk parameter $X_L$ and the right-eye crosstalk parameter $X_R$. The formulas can be described as below:

The calibrated left-eye image data is:

$$L_f = \frac{(L_i - R_i \times X_L)}{(1 - X_R \times X_L)}.$$

The calibrated right-eye image data is:

$$R_f = \frac{(R_i - L_i \times X_R)}{(1 - X_R \times X_L)}.$$

Divide a difference between the left-eye image data $L_i$ and a product of the right-eye image data $R_i$ and the left-eye crosstalk parameter $X_L$ by a difference between 1 and a product of the left-eye crosstalk parameter $X_L$ and the right-eye crosstalk parameter $X_R$ to generate the calibrated left-eye image data $L_f$; and divide a difference between the right-eye image data $R_i$ and a product of the left-eye image data $L_i$ and the right-eye crosstalk parameter $X_R$ by a difference between 1 and a product of the left-eye crosstalk parameter $X_L$ and the right-eye crosstalk parameter $X_R$ to generate the calibrated right-eye image data $R_f$.

In step S150, the calibrated left-eye image data $L_f$ and the calibrated right-eye image data $R_f$ are displayed on the display apparatus.

When the display apparatus displays image data of both eyes, and only the first eye of the two eyes is watching the display apparatus, the image data of the second eye will cause interference to the image data of the first eye. The level of interference is related to the gray level difference between the image data of the two eyes. In the first embodiment of the present disclosure, various left-eye crosstalk parameters $X_L$ and right-eye crosstalk parameters $X_R$ are generated according to various grey level combinations of the image data of the two eyes to prevent under compensation and over compensation caused by the conventional constant crosstalk parameter.

Figure 2:
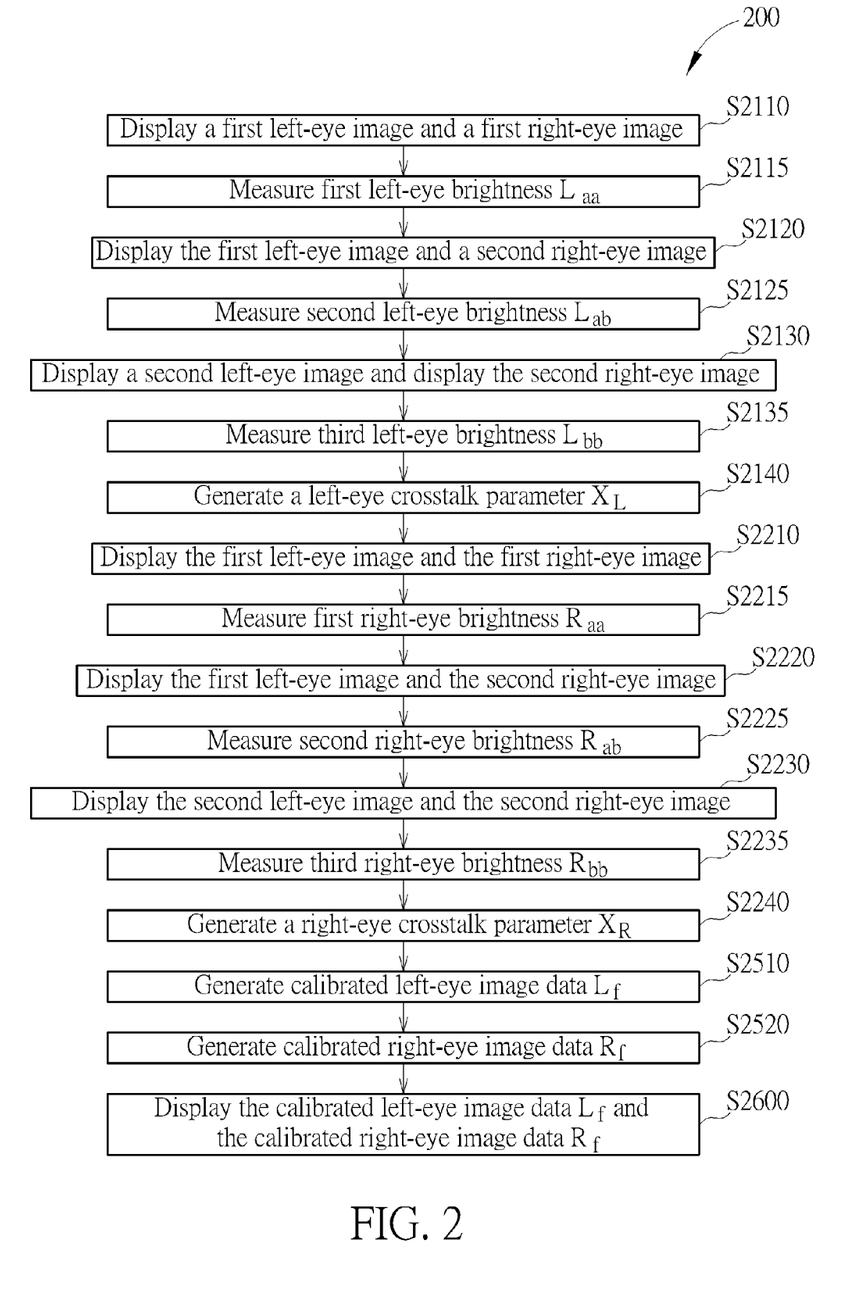
FIG. 2 is a flowchart of a stereoscopic display method according to another embodiment of the present invention.

Referring to FIG. 2, FIG. 2 is a flowchart of a stereoscopic display method 200 according to another embodiment of the disclosure. Steps of the stereoscopic display method 200 are described as follows. However the steps do not have to be in the following sequence. For example, steps S2120 and S2125 can be performed before steps S2110 and S2115. Further certain steps can be combined. For instance, steps S2115 and S2215 can be performed when performing step S2110. In this way, step S2210 can be skipped.

S2110: display a first left-eye image with first gray level, and display a first right-eye image with the first gray level, the first gray level being corresponding to left-eye image data $L_i$;

S2115: measure first left-eye brightness $L_{aa}$ received by the left eye when displaying the first left-eye image and displaying the first right-eye image;

S2120: display the first left-eye image with the first gray level, and display a second right-eye image with a second gray level, the second gray level being corresponding to the right-eye image data $R_i$;

S2125: measure second left-eye brightness $L_{ab}$ received by the left eye when displaying the first left-eye image and displaying the second right-eye image;

S2130: display a second left-eye image with the second gray level, and display the second right-eye image with the second gray level;

S2135: measure third left-eye brightness $L_{bb}$ received by the left eye when displaying the second left-eye image and displaying the second right-eye image;

S2140: generate a left-eye crosstalk parameter $X_L$ according to the first left-eye brightness $L_{aa}$, the second left-eye brightness $L_{ab}$, and the third left-eye brightness $L_{bb}$;

S2210: display the first left-eye image with the first gray level, and display the first right-eye image with the first gray level;

S2215: measure first right-eye brightness $R_{aa}$ received by a right eye when displaying the first left-eye image and displaying the first right-eye image;

S2220: display the first left-eye image with the first gray level, and display the second right-eye image with the second gray level;

S2225: measure second right-eye brightness $R_{ab}$ received by the right eye when displaying the first left-eye image and displaying the second right-eye image;

S2230: display the second left-eye image with the second gray level and display the second right-eye image with the second gray level;

S2235: measure third right-eye brightness $R_{bb}$ received by the right eye when displaying the second left-eye image and displaying the second right-eye image;

S2240: generate a right-eye crosstalk parameter $X_R$ according to the first right-eye brightness $R_{aa}$, the second right-eye brightness $R_{ab}$, and the third right-eye brightness $R_{bb}$;

S2510: generate calibrated left-eye image data $L_f$ according to the left-eye image data $L_i$, the right-eye image data $R_i$, the left-eye crosstalk parameter $X_L$, and the right-eye crosstalk parameter $X_R$;

S2520: generate calibrated right-eye image data $R_f$ according to the left-eye image data $L_i$, the right-eye image data $R_i$, the left-eye crosstalk parameter $X_L$, and the right-eye crosstalk parameter $X_R$; and S2600: display the calibrated left-eye image data $L_f$ and the calibrated right-eye image data $R_f$ on a display apparatus.

Detailed steps are depicted below. The left-eye crosstalk parameter $X_L$ caused by the difference between the left-eye image data $L_i$ and the right-eye image data $R_i$ can be calculated through an experimental analysis. In step S2115, the first left-eye brightness $L_{aa}$ received by the left eye is measured when displaying the first left-eye image with the first gray level and displaying the first right-eye image with the first gray level. In step S2125, the second left-eye brightness $L_{ab}$ received by the left eye is measured when displaying the first left-eye image with the first gray level and displaying the second right-eye image with the second gray level. In step S2135, the third left-eye brightness $L_{bb}$ received by the left eye is measured when displaying the second left-eye image with the second gray level and displaying the second right-eye image with the second gray level. The first left-eye brightness $L_{aa}$, the second left-eye brightness $L_{ab}$ and the third left-eye brightness $L_{bb}$ can be measured by instruments such as a display color analyzer.

Then, in step S2140, the left-eye crosstalk parameter $X_L$ can be generated according to the first left-eye brightness $L_{aa}$, the second left-eye brightness $L_{ab}$, and the third left-eye brightness $L_{bb}$. Specifically, the left-eye crosstalk parameter $X_L$ can be calculated by the formula $$X_L = \left| \frac{L_{aa} - L_{ab}}{L_{aa} - L_{bb}} \right|,$$

which is an absolute value of a ratio of a difference between the first left-eye brightness $L_{aa}$ and the second left-eye brightness $L_{ab}$ and a difference between the first left-eye brightness $L_{aa}$ and the third left-eye brightness $L_{bb}$.

Figure 1D:
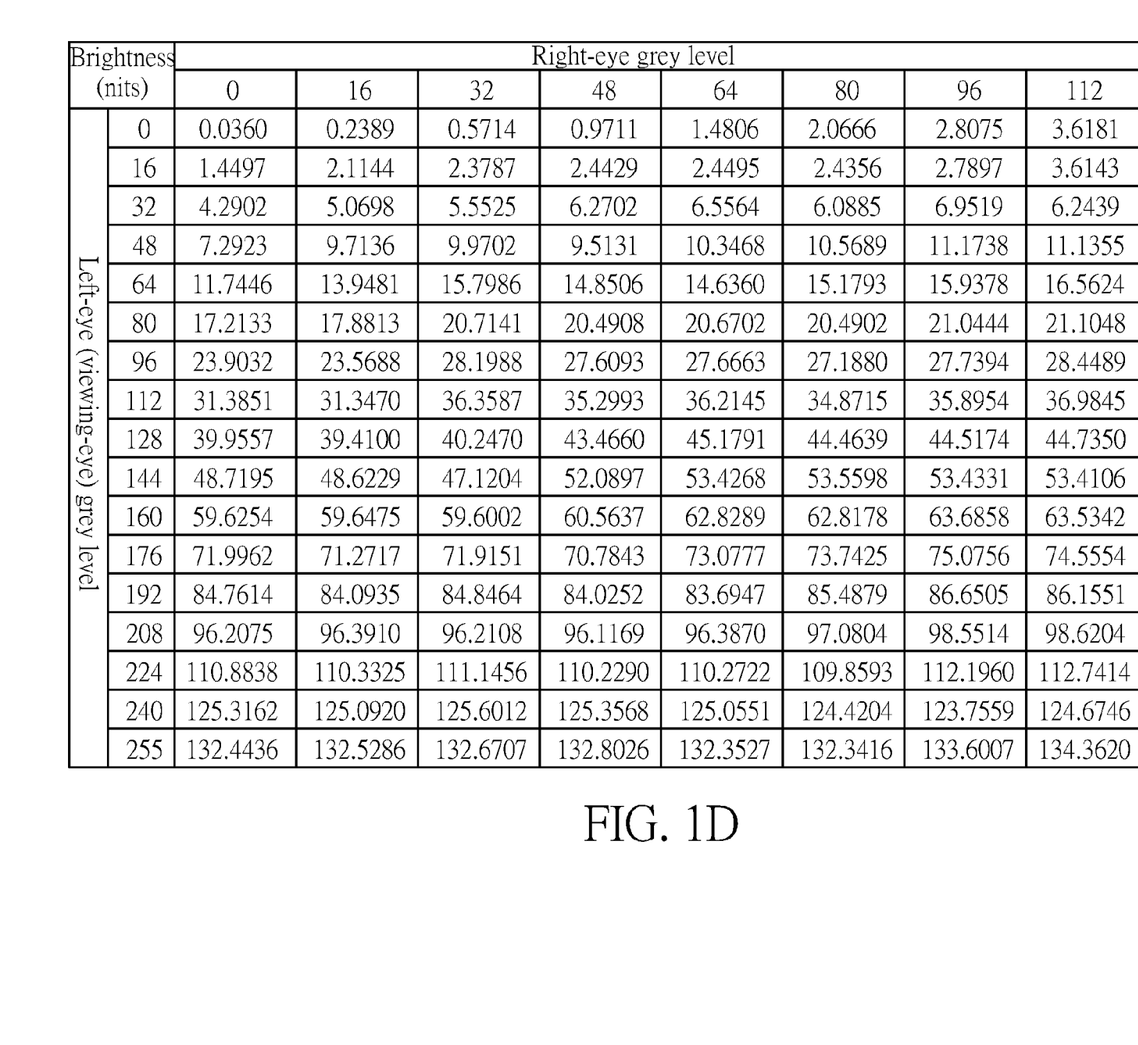

Referring to FIGS. 1D and 1E, FIGS. 1D and 1E are left-eye brightness tables according to grey levels of the left-eye image data $L_i$ and right-eye image data $R_i$, which represents brightness observed by the left eye (left-eye brightness) when displaying corresponding left-eye image data $L_i$ and corresponding right-eye image data $R_i$. Grey levels of the left-eye image data $L_i$ are shown along the y-axis and grey levels of the right-eye image data $R_i$ are shown along the x-axis. The brightness can be measured in nits (candela per square meter, $cd/m^2$), and it can be measured by the display color analyzer but not limited to such a device.

According to FIG. 1D, the first left-eye brightness $L_{aa}$ is 35.9845 nits when the grey levels of the left-eye image data $L_i$ and the right-eye image data $R_i$ are both 112; the second left-eye brightness $L_{ab}$ is 36.2145 nits when the grey level of the left-eye image data $L_i$ is 112 and the grey level of the right-eye image data $R_i$ is 64; the third left-eye brightness $L_{bb}$ is 14.6360 nits when the grey levels of the left-eye image data $L_i$ and the right-eye image data $R_i$ are both 64. By using the formula $$X_L = \left| \frac{L_{aa} - L_{ab}}{L_{aa} - L_{bb}} \right|,$$

the left-eye crosstalk parameter $X_L$ is calculated to be about 0.01077, essentially equals to 1.08%. As shown in FIG. 1B, when the grey level of the left-eye image data $L_i$ is 112 and the grey level of the right-eye image data $R_i$ is 64, the left-eye crosstalk parameter $X_L$ is about 1.1% which is similar to the calculated 1.08%. FIGS. 1D and 1E are experimental results, panels processed under similar condition may generate similar experimental results, however, not all panels processed under similar conditions always have similar characteristics.

In another example, the first left-eye brightness $L_{aa}$ is 2.1144 nits when the grey levels of the left-eye image data $L_i$ and the right-eye image data $R_i$ are both 16; the second left-eye brightness $L_{ab}$ is 2.3787 nits when the grey level of the left-eye image data $L_i$ is 16 and the right-eye image data $R_i$ is 32; the third left-eye brightness $L_{bb}$ is 5.5525 nits when the grey levels of the left-eye image data $L_i$ and the right-eye image data $R_i$ are both 32. By using the formula $$X_L = \left| \frac{L_{aa} - L_{ab}}{L_{aa} - L_{bb}} \right|,$$

the left-eye crosstalk parameter $X_L$ is calculated to be about 0.0768, essentially equals to 7.68%. As shown in FIG. 1B, when the grey level of the left-eye image data $L_i$ is 16 and the grey level of the right-eye image data $R_i$ is 32, the left-eye crosstalk parameter $X_L$ is about 7.7% which is similar to the calculated 7.68%. Therefore, a desirable left-eye crosstalk parameter $X_L$ can be approximated either through experimental results in FIGS. 1D and 1E or by referring to the left-eye grey level crosstalk parameter look up table LX-LUT which can be formed adaptively according to characteristics of each display panel or a viewer's choice so as to enhance image quality of a stereoscopic image by compensating crosstalk of the displayed image.

The right-eye crosstalk parameter $X_R$ caused by the difference between the left-eye image data $L_i$ and the right-eye image data $R_i$ can be calculated through an experimental analysis. In step S2215, the first right-eye brightness $R_{aa}$ received by a right eye is measured when displaying the first left-eye image with the first gray level and displaying the first right-eye image with the first gray level. In step S2225, the second right-eye brightness $R_{ab}$ received by the right eye is measured when displaying the first left-eye image with the first gray level and displaying the second right-eye image with the second gray level. In step S2235, the third right-eye brightness $R_{bb}$ received by the right eye is measured when displaying the second left-eye image with the second gray level and displaying the second right-eye image with the second gray level. The first right-eye brightness $R_{aa}$, the second right-eye brightness $R_{ab}$, and the third right-eye brightness $R_{bb}$ can be measured by instruments such as a display color analyzer.

Then, in step S2240, the right-eye crosstalk parameter $X_R$ can be generated according to the first right-eye brightness $R_{aa}$, the second right-eye brightness $R_{ab}$, and the third right-eye brightness $R_{bb}$. Specifically, the right-eye crosstalk parameter $X_R$ can be calculated by the formula $$X_R = \left| \frac{R_{ab} - R_{bb}}{R_{aa} - R_{bb}} \right|,$$

which is an absolute value of a ratio of a difference between the second right-eye brightness $R_{ab}$ and the third right-eye brightness $R_{bb}$ and a difference between the first right-eye brightness $R_{aa}$ and the third right-eye brightness $R_{bb}$.

Figure 1F:
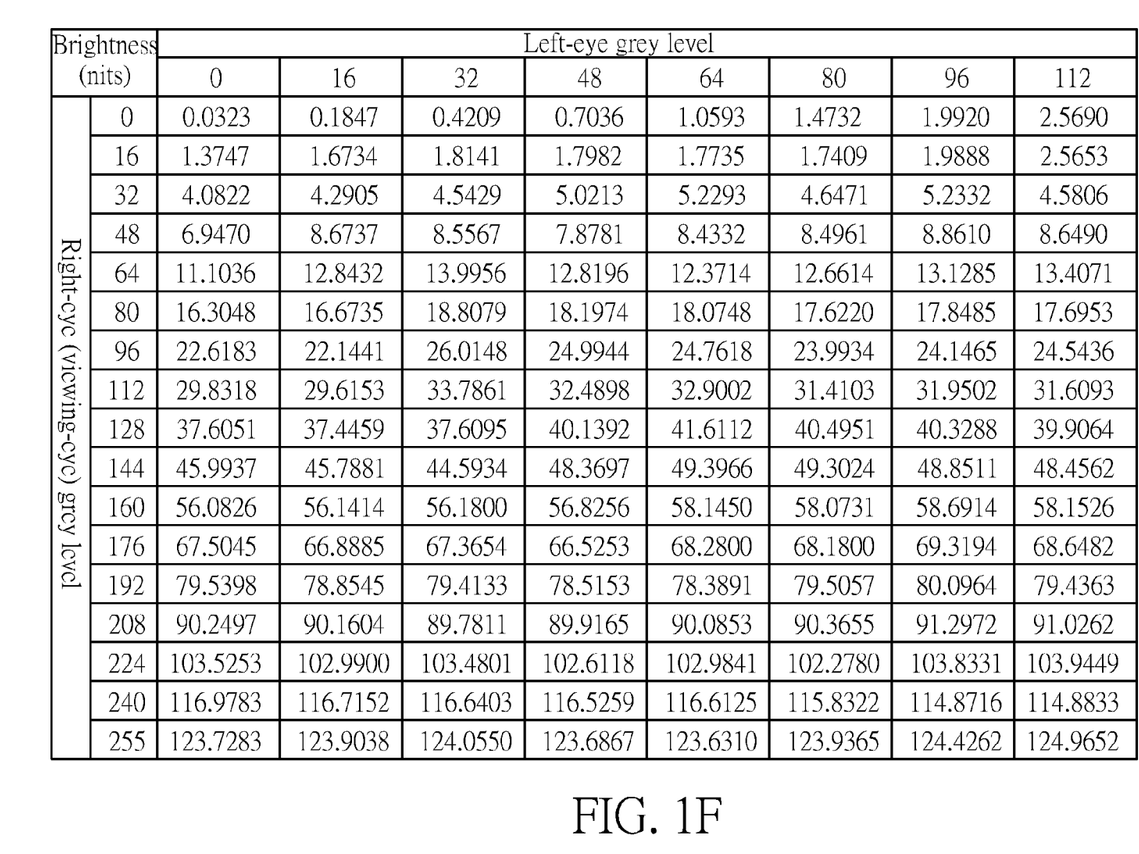
FIGS. 1F and 1G are right-eye brightness tables according to one embodiment of the present invention.
Figure 1G:
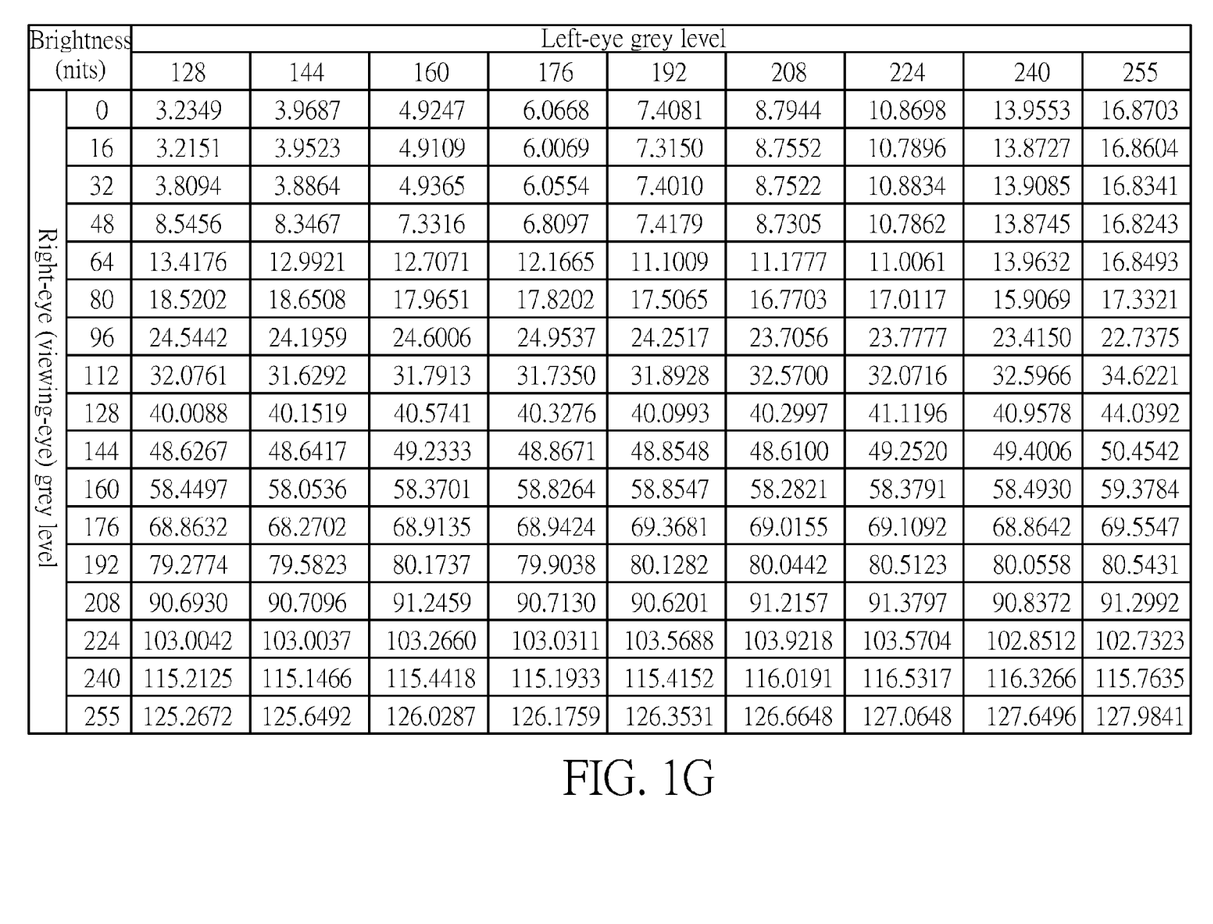

Referring to FIGS. 1F and 1G, FIG. 1E is a right-eye brightness table according to grey levels of the left-eye image data $L_i$ and right-eye image data $R_i$, which represents brightness observed by the right eye (right-eye brightness) when displaying corresponding left-eye image data $L_i$ and corresponding right-eye image data $R_i$. Grey levels of the left-eye image data $L_i$ are shown along the x-axis and grey levels of the right-eye image data $R_i$ are shown along the y-axis. The brightness can be measured in nits (candela per square meter, cd/m$^2$), and it can be measured by the display color analyzer but not limited to such a device.

According to FIG. 1F, the first right-eye brightness $R_{aa}$ is 31.6093 nits when the grey levels of the left-eye image data $L_i$ and the right-eye image data $R_i$ are both 112; the second right-eye brightness $R_{ab}$ is 13.4071 nits when the grey level of the left-eye image data $L_i$ is 112 and the gray level of the right-eye image data $R_i$ is 64; the third right-eye brightness $R_{bb}$ is 12.3714 nits when the grey levels of the left-eye image data $L_i$ and the right-eye image data $R_i$ are both 64. By using the formula $$X_R = \left| \frac{R_{ab} - R_{bb}}{R_{aa} - R_{bb}} \right|,$$

the right-eye crosstalk parameter $X_R$ is calculated to be 0.0538 about 5.38%. As shown in FIG. 1C, when the grey level of the left-eye image data $L_i$ is 112 and the grey level of the right-eye image data $R_i$ is 64, the right-eye crosstalk parameter $X_R$ is about 5.4% which is similar to the calculated 5.38%. Therefore, a desirable right-eye crosstalk parameter $X_R$ can be approximated either through experimental results in FIGS. 1F and 1G or by referring to the right-eye grey level crosstalk parameter look up table RX-LUT which can be formed adaptively according to characteristics of each display panel or a viewer's choice so as to enhance image quality of a stereoscopic image by compensating crosstalk of the displayed image. FIGS. 1F and 1G are experimental results, panels processed under similar condition may generate similar experimental results, however, not all panels processed under similar conditions always have similar characteristics.

The remaining steps S2510, S2520 and S2600 are essentially similar to steps S130, S140, and S150. The calibrated left-eye image data $L_f$ and the calibrated right-eye image data $R_f$ are generated according to the left-eye image data $L_i$, the right-eye image data $R_i$, the left-eye crosstalk parameter $X_L$ and the right-eye crosstalk parameter $X_R$. Then the calibrated left-eye image data $L_f$ and the calibrated right-eye image data $R_f$ are displayed on the display apparatus.

Figure 3:
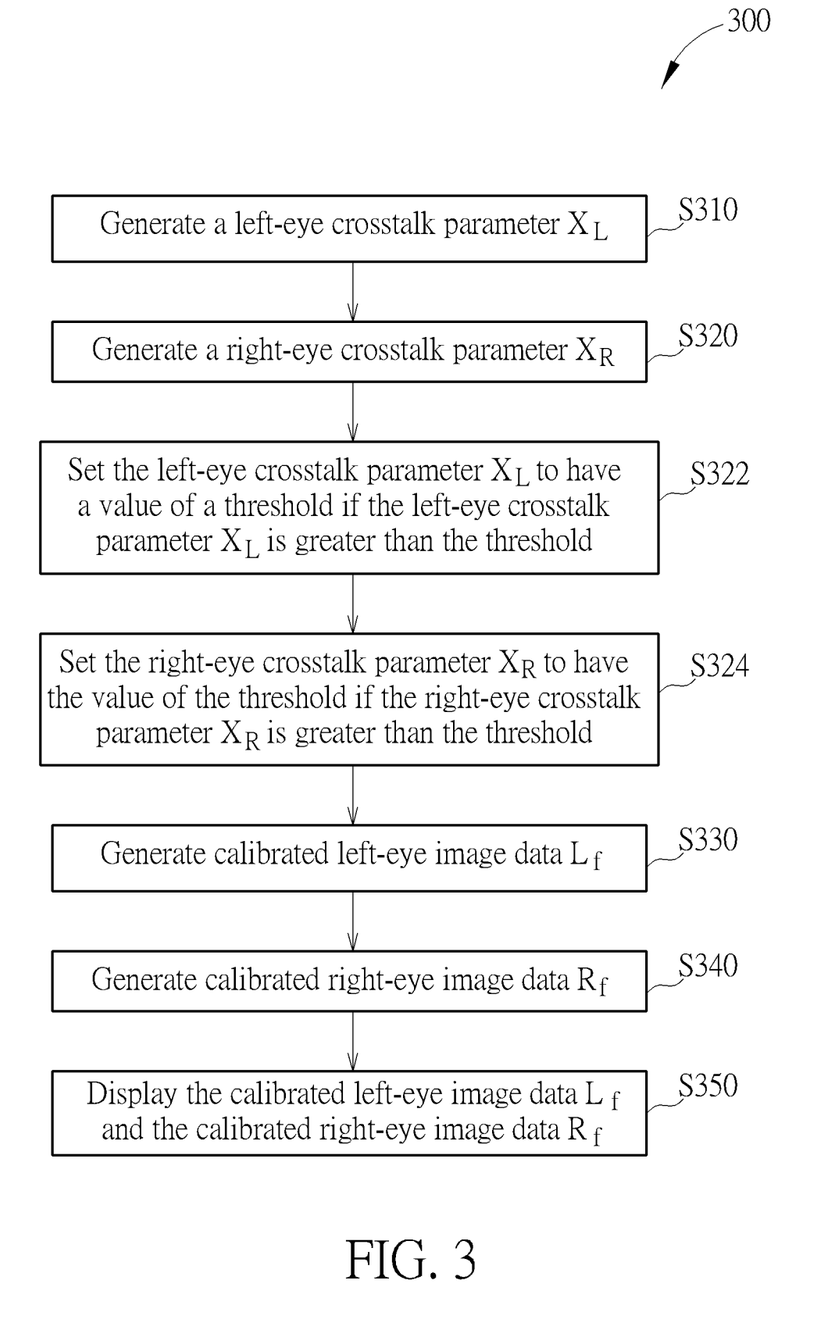
FIG. 3 is a flowchart of a stereoscopic display method according to another embodiment of the present invention.

Referring to FIG. 3, FIG. 3 is a flowchart of a stereoscopic display method 300 of another embodiment of the disclosure, steps of the stereoscopic display method 300 is described as following. However the steps do not have to be in the following sequence. For example, step S320 can be performed before step S310.

S310: generate a left-eye crosstalk parameter $X_L$ according to left-eye image data $L_i$ and right-eye image data $R_i$;

S320: generate a right-eye crosstalk parameter $X_R$ according to the left-eye image data $L_i$ and the right-eye image data $R_i$;

S322: set the left-eye crosstalk parameter $X_L$ to have a value of a threshold if the left-eye crosstalk parameter $X_L$ is greater than the threshold;

S324: set the right-eye crosstalk parameter $X_R$ to have the value of the threshold if the right-eye crosstalk parameter $X_R$ is greater than the threshold;

S330: generate calibrated left-eye image data $L_f$ according to the left-eye image data $L_i$, the right-eye image data $R_i$, the left-eye crosstalk parameter $X_L$, and the right-eye crosstalk parameter $X_R$;

S340: generate calibrated right-eye image data $R_f$ according to the left-eye image data $L_i$, the right-eye image data $R_i$, the left-eye crosstalk parameter $X_L$, and the right-eye crosstalk parameter $X_R$; and S350: display the calibrated left-eye image data $L_f$ and the calibrated right-eye image data $R_f$ on a display apparatus.

Most steps of the stereoscopic display method 300 are similar to the stereoscopic display method 100. The difference between the stereoscopic display method 300 and the stereoscopic display method 100 is the stereoscopic display method 300 further comprises step S322 and step S324. Detailed explanation of steps S322 and S324 are depicted below. To avoid over compensation at a local area, a threshold can be assigned to be an upper limit for the left-eye crosstalk parameter $X_L$ and the right-eye crosstalk parameter $X_R$. The threshold can be assigned a value automatically or manually. If the left-eye crosstalk parameter $X_L$ is larger than the threshold, the left-eye crosstalk parameter $X_L$ is assigned to have the value of the threshold. If the right-eye crosstalk parameter $X_R$ is larger than the threshold, the right-eye crosstalk parameter $X_R$ is assigned to have the value of the threshold. Take FIG. 1B as an example, most of the left-eye crosstalk parameters $X_L$ are smaller than 10% but some of them are larger than 10%. If a left-eye crosstalk parameter $X_L$ having a value greater than 10% is used to calibrate the left-eye image data $L_i$ at the local area, the generated calibrated left-eye image data $L_f$ might be overly compensated.

In other words, the effect of crosstalk is less strong in certain ranges of gray levels. For instance, in a dark image, if a large crosstalk parameter is used to calibrate image data, the calibrated image data might be overly compensated. Hence, a grey level range can be chosen, and a crosstalk parameter in the range can be assigned to have a value of a threshold if the crosstalk parameter is greater than the threshold, but a crosstalk parameter outside the range need not be assigned to have a value of a threshold if the crosstalk parameter is greater than the threshold. Please refer to FIG. 1B, the left-eye crosstalk parameters $X_L$ differ substantially for left-eye grey levels less than 144 and right-eye grey levels less than 32. Thus the left-eye crosstalk parameters $X_L$ having a value greater than 10% in this range can be assigned a value of 10% or another percentage to minimize the over compensation effect and to improve image quality. Please refer to FIG. 1C, the right-eye crosstalk parameter $X_R$ differ substantially for left-eye grey levels above 240. Thus right-eye crosstalk parameter $X_R$ having a value greater than 10% in this range can be assigned a value of 10% or another percentage to minimize the over compensation effect and to improve image quality. In another embodiment, all crosstalk parameters having values greater than the threshold can be assigned to have the value of the threshold.

Figure 4:
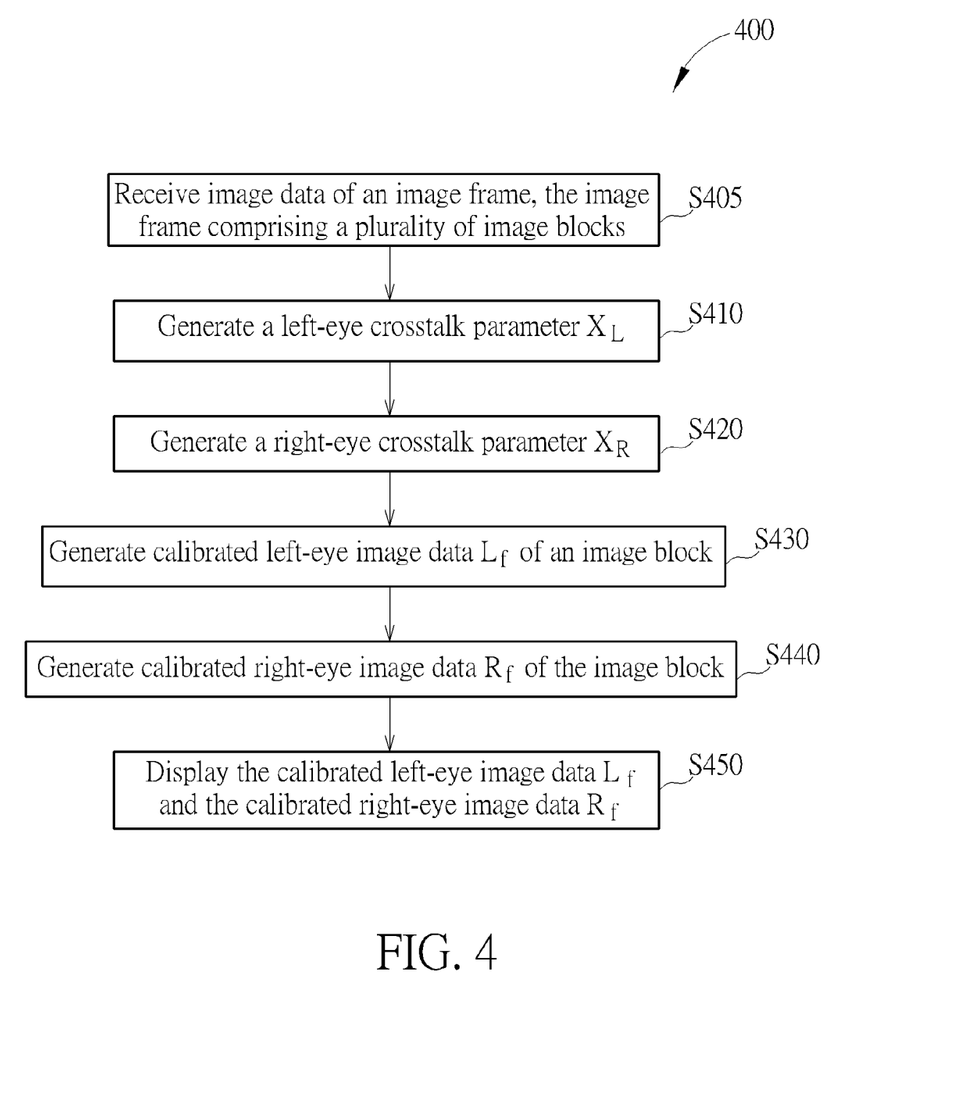
FIG. 4 is a flowchart of a stereoscopic display method according to another embodiment of the present invention.

Referring to FIG. 4, FIG. 4 is a flowchart of a stereoscopic display method 400 of another embodiment of the disclosure, steps of the stereoscopic display method 400 is described as following. However the steps do not have to be in the following sequence. For example, step S420 can be performed before step S410.

S405: receive image data of an image frame, the image frame comprising a plurality of image blocks;

S410: generate a left-eye crosstalk parameter $X_L$ according to left-eye image data $L_i$ of an image block and right-eye image data $R_i$ of the image block;

S420: generate a right-eye crosstalk parameter $X_R$ according to the left-eye image data $L_i$ and the right-eye image data $R_i$;

S430: generate calibrated left-eye image data $L_f$ of the image block according to the left-eye image data $L_i$, the right-eye image data $R_i$, the left-eye crosstalk parameter $X_L$, and the right-eye crosstalk parameter $X_R$;

S440: generate calibrated right-eye image data $R_f$ of the image block according to the left-eye image data $L_i$, the right-eye image data $R_i$, the left-eye crosstalk parameter $X_L$, and the right-eye crosstalk parameter $X_R$; and S450: display the calibrated left-eye image data $L_f$ and the calibrated right-eye image data $R_f$ on a display apparatus.

Most steps of the stereoscopic display method 400 are similar to the stereoscopic display method 100. The difference between the stereoscopic display method 400 and the stereoscopic display method 100 is the stereoscopic display method 400 further comprises step S405. In step S405, image data of an image frame is received, the image frame comprises a plurality of image blocks. Each of image blocks corresponds to an LX-LUT and an RX-LUT. Different image blocks may correspond to different sets of LX-LUT and RX-LUT so that identical image data in different image blocks may be calibrated differently. Since characteristics of a display apparatus may not be identical throughout the display apparatus, this approach of calibration can compensate inconsistencies in different parts of the display apparatus. Hence, using spatial divisional manner would be desirable if the display apparatus has some defects so as to generate a more consistent global area image.

Modified embodiments based on the disclosure can be applied to stereoscopic mobile display devices, electrical display devices and divisional stereoscopic display apparatus such as a patterned retarder display system. In order to avoid crosstalk effect by non-viewing eye, the left-eye image data $L_i$ and right-eye image data $R_i$ can be calibrated with opposite polarities. Time divisional stereoscopic display apparatus is also applied in the disclosure such as a scanning retarder display system to avoid crosstalk effect caused by scanning delay.

In summary, a stereoscopic display method is disclosed. The left-eye crosstalk parameters and right-eye crosstalk parameters are adjusted according to grey levels of left-eye image data and right-eye image data so as to prevent over compensation and under compensation of image data to enhance image quality. Still, the left-eye crosstalk parameters and right-eye crosstalk parameters can be adaptively adjusted according to various characteristics of display panels. Further a plurality of LX-LUTs and RX-LUTs corresponding to different portions of a display apparatus can be utilized to calibrate image data in different portions of the display apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stereoscopic display method, comprising:
generating a left-eye crosstalk parameter according to left-eye image data and right-eye image data;
generating a right-eye crosstalk parameter according to the left-eye image data and the right-eye image data;
generating calibrated left-eye image data by dividing a difference between the left-eye image data and a product of the right-eye image data and the left-eye crosstalk parameter by a difference between 1 and a product of the left-eye crosstalk parameter and the right-eye crosstalk parameter;
generating calibrated right-eye image data by dividing a difference between the right-eye image data and a product of the left-eye image data and the right-eye crosstalk parameter by a difference between 1 and a product of the left-eye crosstalk parameter and the right-eye crosstalk parameter; and
displaying the calibrated left-eye image data and the calibrated right-eye image data on a display apparatus.

2. The method of claim 1, wherein:
generating the left-eye crosstalk parameter according to the left-eye image data and the right-eye image data comprises:
generating the left-eye crosstalk parameter according to a left-eye grey level crosstalk look up table, the left-eye image data, and the right-eye image data, wherein the left-eye grey level crosstalk look up table comprises left-eye crosstalk parameters caused by the right-eye image data when the display apparatus is viewed by a left eye; and generating the right-eye crosstalk parameter according to the left-eye image data and the right-eye image data comprises:
generating the right-eye crosstalk parameter according to a right-eye grey level crosstalk look up table, the left-eye image data, and the right-eye image data, wherein the right-eye grey level crosstalk look up table lists right-eye crosstalk parameters caused by the left-eye image data when the display apparatus is viewed by a right eye.

3. The method of claim 1, wherein:
generating the left-eye crosstalk parameter according to the left-eye image data and the right-eye image data comprises:
displaying a first left-eye image with a first gray level, and displaying a first right-eye image with the first gray level;
measuring first left-eye brightness received by a left eye when displaying the first left-eye image and displaying the first right-eye image;
displaying the first left-eye image with the first gray level, and displaying a second right-eye image with a second gray level;
measuring second left-eye brightness received by the left eye when displaying the first left-eye image and displaying the second right-eye image;
displaying a second left-eye image with the second gray level, and displaying the second right-eye image with the second gray level;
measuring third left-eye brightness received by the left eye when displaying the second left-eye image and displaying the second right-eye image; and
generating the left-eye crosstalk parameter according to the first left-eye brightness, the second left-eye brightness, and the third left-eye brightness; and
generating the right-eye crosstalk parameter according to the left-eye image data and the right-eye image data comprises:
displaying the first left-eye image with the first gray level, and displaying the first right-eye image with the first gray level;
measuring first right-eye brightness received by a right eye when displaying the first left-eye image and displaying the first right-eye image;
displaying the first left-eye image with the first gray level, and displaying the second right-eye image with the second gray level;
measuring second right-eye brightness received by the right eye when displaying the first left-eye image and displaying the second right-eye image;
displaying the second left-eye image with the second gray level and displaying the second right-eye image with the second gray level;
measuring third right-eye brightness received by the right eye when displaying the second left-eye image and displaying the second right-eye image; and
generating the right-eye crosstalk parameter according to the first right-eye brightness, the second right-eye brightness, and the third right-eye brightness;
wherein the first gray level corresponds to the left-eye image data, and the second gray level corresponds to the right-eye image data.

4. The method of claim 3, wherein:
generating the left-eye crosstalk parameter according to the first left-eye brightness, the second left-eye brightness, and the third left-eye brightness comprises:
generating an absolute value of a ratio of a difference between the first left-eye brightness and the second left-eye brightness and a difference between the first left-eye brightness and the third left-eye brightness; and
generating the right-eye crosstalk parameter according to the first right-eye brightness, the second right-eye brightness, and the third right-eye brightness comprises:
generating an absolute value of a ratio of a difference between the second right-eye brightness and the third right-eye brightness and a difference between the first right-eye brightness and the third right-eye brightness.

5. The method of claim 3, wherein:
generating the left-eye crosstalk parameter $X_L$ according to the first left-eye brightness, the second left-eye brightness, and the third left-eye brightness comprises:

$$X_L = \left| \frac{L_{aa} - L_{ab}}{L_{aa} - L_{bb}} \right|,$$

wherein $X_L$ is the left-eye crosstalk parameter, $L_{aa}$ is the first left-eye brightness, $L_{ab}$ is the second left-eye brightness, $L_{bb}$ is the third left-eye brightness; and
generating the right-eye crosstalk parameter $X_R$ according to the first right-eye brightness, the second right-eye brightness, and the third right-eye brightness comprises:

$$X_R = \left| \frac{R_{ab} - R_{bb}}{R_{aa} - R_{bb}} \right|,$$

wherein $X_R$ is the right-eye crosstalk parameter, $R_{aa}$ is the first right-eye brightness, $R_{ab}$ is the second right-eye brightness, $R_{bb}$ is the third right-eye brightness.

6. The method of claim 1, further comprising:
setting the left-eye crosstalk parameter as a threshold if the left-eye crosstalk parameter is not smaller than the threshold; and
setting the right-eye crosstalk parameter as the threshold if the right-eye crosstalk parameter is not smaller than the threshold.

7. The method of claim 1, further comprising:
receiving the left-eye image data and the right-eye image data of an image frame, the image frame comprising a plurality of image blocks.

8. A stereoscopic display method, comprising:
receiving image data of an image frame, the image frame comprising a plurality of image blocks;
in each of the image blocks,
generating a left-eye crosstalk parameter according to left-eye image data of the image block and right-eye image data of the image block;
generating a right-eye crosstalk parameter according to the left-eye image data and the right-eye image data;
generating calibrated left-eye image data of the image block by dividing a difference between the left-eye image data and a product of the right-eye image data and the left-eye crosstalk parameter by a difference between 1 and a product of the left-eye crosstalk parameter and the right-eye crosstalk parameter; and
generating calibrated right-eye image data of the image block by dividing a difference between the right eye image data and a product of the left-eye image data and the right-eye crosstalk parameter by a difference between 1 and a product of the left-eye crosstalk parameter and the right-eye crosstalk parameter; and displaying calibrated left-eye image data and calibrated right-eye image data of the image blocks on a display apparatus.

9. The method of claim 8, wherein:

each of the image blocks corresponds to a left-eye grey level crosstalk look up table and a right-eye grey level crosstalk look up table, the left-eye grey level crosstalk look up table lists left-eye crosstalk parameters caused by the right-eye image data when the display apparatus is viewed by a left eye, and the right-eye grey level crosstalk look up table lists right-eye crosstalk parameters caused by the left-eye image data when the display apparatus is viewed by a right eye;

generating the left-eye crosstalk parameter according to the left-eye image data and the right-eye image data comprises:

generating the left-eye crosstalk parameter according to a corresponding left-eye grey level crosstalk look up table, the left-eye image data, and the right-eye image data; and generating the right-eye crosstalk parameter according to the left-eye image data and the right-eye image data comprises:

generating the right-eye crosstalk parameter according to a corresponding right-eye grey level crosstalk look up table, the left-eye image data, and the right-eye image data.

10. The method of claim 8, wherein:

generating the left-eye crosstalk parameter according to the left-eye image data and the right-eye image data comprises:

displaying a first left-eye image with a first gray level and a first right-eye image with the first gray level;

measuring first left-eye brightness received by a left eye when displaying the first left-eye image and the first right-eye image;

displaying the first left-eye image with the first gray level and a second right-eye image with a second gray level;

measuring second left-eye brightness received by the left eye when displaying the first left-eye image and the second right-eye image;

displaying a second left-eye image with the second gray level and a second right-eye image with the second gray level;

measuring third left-eye brightness received by the left eye when displaying the second left-eye image and the second right-eye image; and generating the left-eye crosstalk parameter according to the first left-eye brightness, the second left-eye brightness, and the third left-eye brightness; and generating the right-eye crosstalk parameter according to the left-eye image data and the right-eye image data comprises:

displaying the first left-eye image with the first gray level and the first right-eye image with the first gray level;

measuring first right-eye brightness received by a right eye when displaying the first left-eye image and the first right-eye image;

displaying the first left-eye image with the first gray level and the second right-eye image with the second gray level;

measuring second right-eye brightness received by the right eye when displaying the first left-eye image and the second right-eye image;

displaying the second left-eye image with the second gray level and the second right-eye image with the second gray level;

measuring third right-eye brightness received by the right eye when displaying the second left-eye image and the second right-eye image; and generating the right-eye crosstalk parameter according to the first right-eye brightness, the second right-eye brightness, and the third right-eye brightness;

wherein the first gray level corresponds to the left-eye image data, and the second gray level corresponds to the right-eye image data.

11. The method of claim 10, wherein:

generating the left-eye crosstalk parameter according to the first left-eye brightness, the second left-eye brightness, and the third left-eye brightness comprises:

generating an absolute value of a ratio of a difference between the first left-eye brightness and the second left-eye brightness and a difference between the first left-eye brightness and the third left-eye brightness; and generating the right-eye crosstalk parameter according to the first right-eye brightness, the second right-eye brightness, and the third right-eye brightness comprises:

generating an absolute value of a ratio of a difference between the second right-eye brightness and the third right-eye brightness and a difference between the first right-eye brightness and the third right-eye brightness.

12. The method of claim 10, wherein:

generating the left-eye crosstalk parameter according to the first left-eye brightness, the second left-eye brightness, and the third left-eye brightness comprises:

$$X_L = \left| \frac{L_{aa} - L_{ab}}{L_{aa} - L_{bb}} \right|,$$

wherein $X_L$ is the left-eye crosstalk parameter, $L_{aa}$ is the first left-eye brightness, $L_{ab}$ is the second left-eye brightness, $L_{bb}$ is the third left-eye brightness; and generating the right-eye crosstalk parameter according to the first right-eye brightness, the second right-eye brightness, and the third right-eye brightness comprises:

$$X_R = \left| \frac{R_{ab} - R_{bb}}{R_{aa} - R_{bb}} \right|,$$

wherein $X_R$ is the right-eye crosstalk parameter, $R_{aa}$ is the first right-eye brightness, $R_{ab}$ is the second right-eye brightness, $R_{bb}$ is the third right-eye brightness.

13. The method of claim 8, further comprising:

setting the left-eye crosstalk parameter to have a value of a threshold if the left-eye crosstalk parameter is greater than the threshold; and/or setting the right-eye crosstalk parameter to have the value of the threshold if the right-eye crosstalk parameter is greater than the threshold.

14. The method of claim 13, wherein:

the left-eye image data and the right-eye image data are between a lower bound and an upper bound.

* * * * *